3,632,505
EVAPORATION-REVERSE OSMOSIS WATER DESALINATION SYSTEM
Hazen E. Nelson, West Acton, Mass., assignor to Stone & Webster Engineering Corporation, Boston, Mass.
Filed Sept. 17, 1969, Ser. No. 858,594
Int. Cl. B01d 3/06
U.S. Cl. 203—11                                7 Claims

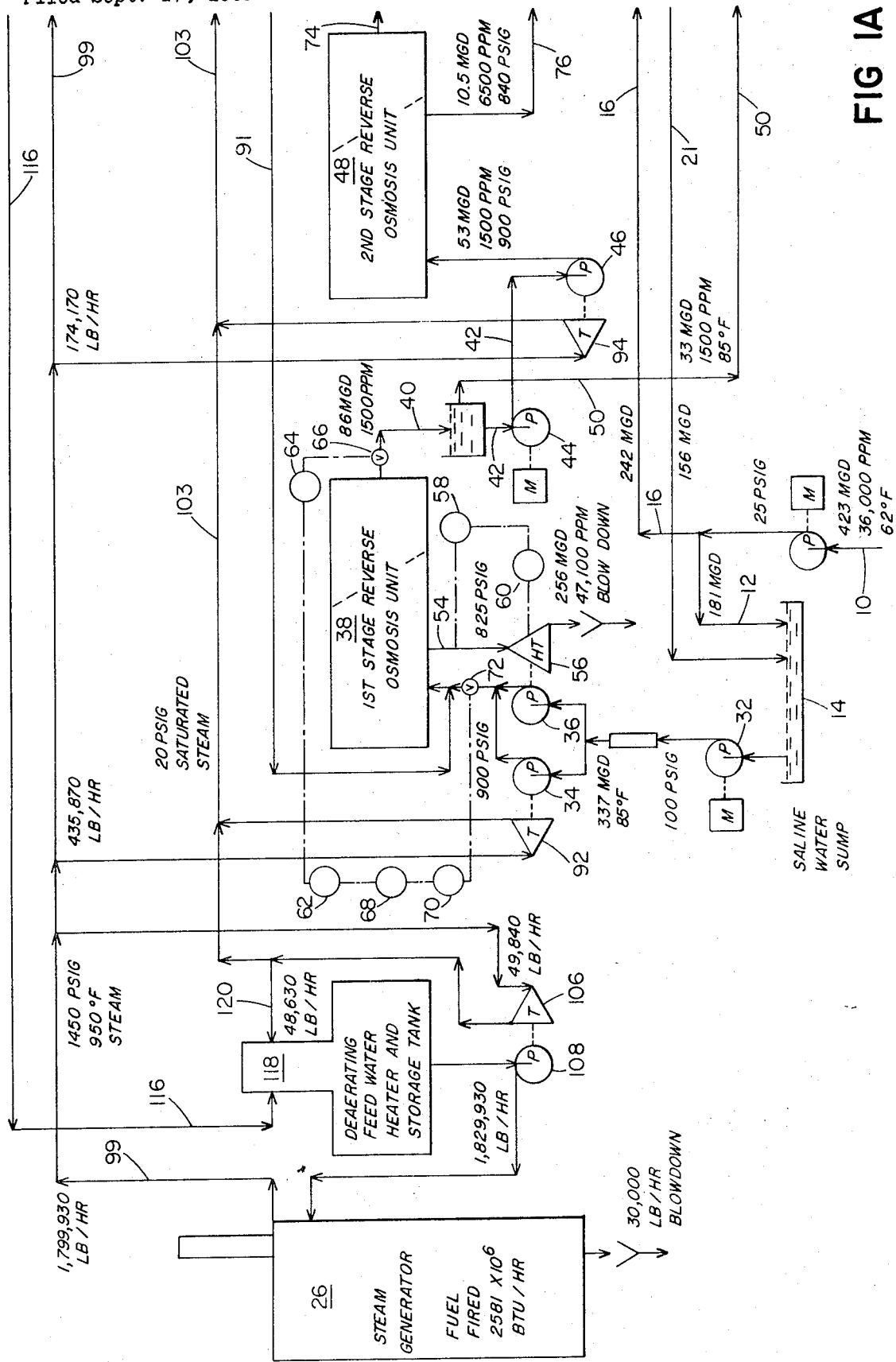
Jan. 4, 1972    H. E. NELSON    3,632,505
EVAPORATION-REVERSE OSMOSIS WATER DESALINATION SYSTEM
Filed Sept. 17, 1969    2 Sheets-Sheet 1
FIG IA United States Patent Office 3,632,505
Patented Jan. 4, 1972

ABSTRACT OF THE DISCLOSURE

Desalination of saline water by evaporation of a portion of the water and passage of the remainder through a reverse osmosis unit after preheating in the evaporator's heat reject section, the product streams from the evaporator and reverse osmosis unit being combined. The pressure of the feed stream to the reverse osmosis unit is controlled by the pressure of the waste brine stream removed from the unit, and the volume of the feed stream to the unit is controlled by the volume of product stream from the unit to provide a combined product stream of constant salinity.

---

Figure 1B:
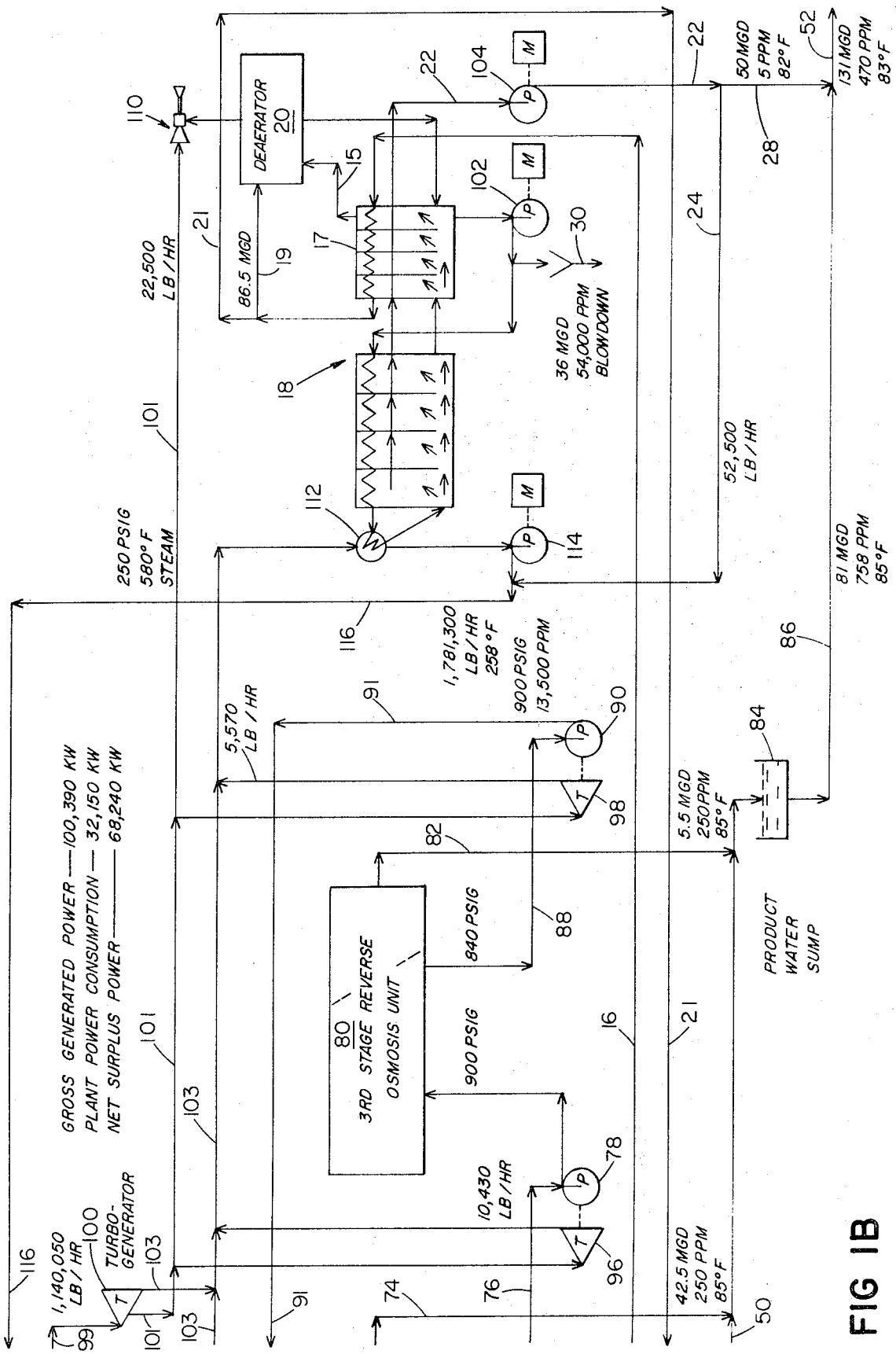

The problem of purifying saline or brackish water to reduce its salt content to a value rendering it useful for irrigation purposes or rendering it potable for humans or animals has existed for many years. There have been many proposals for solving the problem; evaporation or distillation has been widely proposed including both multi-stage flash evaporation and multiple effect distillation as well as combinations of the two; and reverse osmosis or the forcing of water from the salt solution under pressure through a semi-permeable membrane has also been proposed. While a single stage reverse osmosis process has been proposed, it has usually been considered desirable to employ two or three stages or even more.

All of such desalination systems have been slow to gain acceptance because of high cost of the product water, among other disadvantages. While the equipment required for such desalination procedures has been a significant cost item, the amount of energy required to effect separation of the water from the salt has been the principal cost item, the energy required for reducing the salt content from 36,000 p.p.m. (the average salt content of sea water) to 1500 p.p.m. by reverse osmosis being about 9 B.t.u./lb. as mechanical power, and the heat energy required for multi-stage flash distillation to reduce the salt content to approximately 5 to 10 p.p.m. being approximately ten times as much. Indeed, in the case of evaporative desalination procedures, it has been considered virtually essential to integrate the evaporation closely with a power generating plant in order to make economical use of available energy. However, this has introduced the additional problem of adjusting output of the evaporative procedure in accordance with the load demand on the power generating station as well as the problem of relatively poor efficiency in converting the available energy in the form of heat into electrical energy for distribution through a power system.

It has now been found that by combining a reverse osmosis desalination system with an evaporative desalination system, it is possible to obtain a unique balance of energy inputs and outputs of both systems with a minimum loss of energy so that the net energy input is greatly decreased while at the same time, the flux capacity of the equipment used for the reverse osmosis system is increased, thus further reducing the cost of the combined system. This combination further provides great flexibility of operation in that it permits the relative flow rates through the two systems to be adjusted so as to obtain any desired salt content in the combined product ranging from less than 10 p.p.m. (as obtained using evaporation alone) to 1500 p.p.m. (as obtained using a single stage reverse osmosis system alone) from sea water, and also frees the operation of the system from any substantial dependence upon the rate of demand of an associated power system. Significantly benefits of the invention are obtained by combining the systems to provide a product having a salt content from about 250 to about 1,000 p.p.m. when starting with sea water having a salt content of about 36,000 p.p.m. In some embodiments of the invention there is a small surplus of power available after combining the systems, which may economically be made available in the form of surplus electrical power.

Any conventional evaporative system may be used in the invention; although a multi-stage flash evaporator is preferred, a multiple effect evaporator or long tube evaporator may also be used. Similarly, any conventional reverse osmosis system may be used in either single or multiple stages.

In the drawings, FIGS. 1A and 1B provide a schematic representation of one embodiment of the invention showing the manner in which liquid or material flow rates and energy inputs and outputs are balanced.

In the embodiment shown in the drawing, the sea water supply 10 at a temperature of 62° F. having a salt content of about 36,000 p.p.m. is divided into two streams, the minor stream 12 being sent directly to the saline water sump 14 from which the reverse osmosis system is fed, and the major stream 16 being sent through the heat rejection or condenser portion 17 of the multi-stage flash evaporator unit 18 where it is heated. This latter stream is in turn divided into two streams, the minor stream 19 being sent through the deaerator 20 to the flash evaporator. Inert gases are also vented from condenser portion 17 through line 15 to deaerator 20. The major stream 21 from evaporator unit 18 is sent to saline water sump 14 to provide, in combination with minor stream 12, a supply at a temperature of 85° F. for the reverse osmosis system. The elevated temperature of this saline water supply makes it possible to achieve a higher flux value through the mebranes of the reverse osmosis units than would be the case if the original sea water at 62° F. were used directly.

In the multi-stage flash evaporator 18 feed stream 19 amounting to approximately 86.5 million gallons per day is partly evaporated to provide a product stream 22 having a salt content of only 5 p.p.m. at a temperature of approximately 82° F. This product stream amounts to 50 million gallons per day (m.g.d.) of which a very small fraction amounting to 52,500 lb. per hour is withdrawn in stream 24 as a part of the feed for the main steam generator boiler 26. The principal portion of the product stream is passed through line 28 for blending with the product from the reverse osmosis system. The remainder of the sea water introduced into the multi-stage flash evaporator is withdrawn as brine stream 30 which amounts to approximately 36 m.g.d. and has a salt content of 54,000 p.p.m.

The mixture in saline water sump 14 at a temperature of 85° F. is pumped through booster pump 32 and feed pumps 34, 36 into the first stage reverse osmosis unit 38 at a pressure of 900 p.s.i.g., the rate of flow of the feed being 337 m.g.d. The output stream 40 from the first stage reverse osmosis unit has a salt content of 1500 p.p.m. and a flow rate of 86 m.g.d. A major portion of the output passes as stream 42 through feed pumps 44, 46 to the second stage reverse osmosis unit 48 at a flow rate of 53 m.g.d. The balance of first stage output stream 40 passes as stream 50 at a flow rate of 33 m.g.d. and a temperature of 85° F. for blending with other product streams to form main output stream 52.

Waste brine stream 54 from the first stage reverse osmosis unit 38, still at elevated pressure, passes first through a hydraulic turbine 56 which serves to drive pump 36. The speed of turbine 56 is controlled to maintain a constant pressure in reverse osmosis unit 38 by means of pressure transmitter 58 and pressure recorder controller 60. The pressure may be adjusted to any desired level by means of controller 60.

The total volume of the throughput of pumps 34 and 36 together, along with the volume of the partially desalinated product stream 40, is maintained constant at the desired level by means of flow recorder controller 62 connected through flow transmitter 64 to flow element 66 in product stream 40 and connected through recorder controller 68 and flow transmitter 70 to flow element 72 in the feed stream. This control arrangement ensures constant salinity of product stream 40. The volume of product stream 40 may be adjusted to any desired level by means of controller 62.

Partially desalinated product stream 74 delivered by the second stage reverse osmosis unit at the rate of 42.5 m.g.d. having a salt content of 250 p.p.m. at a temperature of 85° F. is mixed with product stream 50 from the first stage reverse osmosis unit. Stream 76 containing the rejected saline solution from the second stage reverse osmosis unit having a salt content of 6500 p.p.m. is passed through pump 78 and serves as the feed stream for the third stage reverse osmosis unit 80. Product stream 82 from the third stage osmosis unit having a salt content of 250 p.p.m. and a flow rate of 5.5 m.g.d. at a temperature of 85° F. is mixed with product streams 50 and 74 from the first and second stage units respectively and passed to reverse osmosis system product water sump 84. The combined reverse osmosis system product water stream 86 having a salt content of 758 p.p.m. has a flow rate of 81 m.g.d. and a temperature of 85° F. It is blended with the distilled water product stream 28 to form the combined water product stream having a salt content of 470 p.p.m., a temperature of 83° F. and a flow rate of 131 m.g.d.

Stream 88 containing saline water rejected in the third stage reverse osmosis unit having a salt content of 13,500 p.p.m. at a pressure of 840 p.s.i.g. is pressurized to 900 p.s.i.g. in pump 90 and recycled through line 91 to the feed stream for the first stage reverse osmosis unit.

All of the power to operate both the evaporator and the reverse osmosis units is provided by steam generator 26. Pumps 34, 46, 78, and 90 are driven by steam turbines 92, 94, 96, and 98 respectively, the first two being supplied with steam at 1450 p.s.i.g. and 950° F. from generator 26 through line 99. A turbo generator 100 (FIG. 1B) is also supplied with high pressure steam from line 99 and provides electric power for driving pumps 32, 44 in the reverse osmosis system as well as for driving pumps 102 and 104 in the waste brine stream 30 and distilled water product stream 22, respectively, of the evaporator. High pressure steam is also supplied to turbine 106 driving boiler feed water pump 108.

Steam at 250 p.s.i.g. and 580° F. from the first stage exhaust of turbogenerator 100 is supplied through line 101 to turbines 96 and 98 driving pumps 78 and 90, respectively, in the second and third stages of the reverse osmosis system, and is also supplied to air ejector 110 of the evaporator.

Low pressure steam at 20 p.s.i.g. from the exhausts of turbines 92, 94, 96, 98, and 106 and from the second stage exhaust of turbo generator 100 is supplied through line 103 to heat exchanger 112 of the evaporator; here the steam is condensed and the condensate is passed through pump 114, driven by an electric motor in the same manner as pumps 102 and 104, to condensate return stream 116 supplying deaerator 118 for steam generator 26. A small portion of the low pressure steam amounting to 48,630 lb./hr. is passed directly to the deaerator 118 through line 120.

What is claimed is:

1. Apparatus for desalination of water comprising an evaporator for receiving a feed stream of saline water and discharging a distillate stream, a reverse osmosis system for receiving a feed stream of saline water and discharging a partially desalinated product stream, means for blending said distillate and product streams, and heating means for heating said reverse osmosis feed stream by passing at least a portion thereof in heat exchange relation with the distillate stream.

2. Apparatus as claimed in claim 1 including means for passing said evaporator feed stream through said heating means, and at least one pump for introducing the feed stream into the reverse osmosis system at elevated pressure.

3. Apparatus as claimed in claim 2 in which said reverse osmosis unit provides in addition a brine waste stream, and said apparatus comprises a hydraulic turbine driven by the brine waste stream from the reverse osmosis system, and means operatively connecting said turbine to said pump.

4. Apparatus as claimed in claim 3 including two pumps arranged in parallel for introducing the feed stream into the reverse osmosis system, means responsive to the flow rate of the feed stream into the reverse osmosis system for controlling the flow rate of the partially desalinated product stream, and means responsive to the pressure of said waste brine stream for controlling said hydraulic turbine.

5. Apparatus as claimed in claim 3 in which said reverse osmosis system includes more than a single stage, and said apparatus comprises a pump for introducing a portion of the product stream from the first stage under pressure into a succeeding stage, and means for returning the waste brine stream from the last stage to the feed stream of the first stage.

6. Process of desalinating saline water which comprises passing a stream of said water to an evaporator and removing a distillate stream therefrom, passing a second stream of said water into heat exchange relation with the distillate stream and then to a reverse osmosis system and removing a partially desalinated product stream from the system, and combining the distillate stream with the product stream to provide a combined product stream.

7. Process as claimed in claim 6 in which the second stream is introduced into the system at elevated pressure, the flow rate of the partially desalinated product is controlled in response to the flow rate of the second stream to maintain substantially constant salinity in the partially desalinated product, and in which a waste brine stream is removed from the system and the pressure of the second stream is controlled in response to the pressure of the waste brine stream.

References Cited
UNITED STATES PATENTS

| | | | |
|---|---|---|---|
| 3,340,186 | 9/1967 | Weyl | 202—200 X |
| 3,386,912 | 6/1968 | Lazare | 210—23 X |
| 3,406,096 | 10/1968 | Rodgers | 202—200 X |
| 3,462,362 | 8/1969 | Kollsman | 210—23 |
| 3,528,901 | 9/1970 | Wallace et al. | 210—23 X |
| 2,643,974 | 6/1953 | Impagliazzo | 203—21 X |

NORMAN YUDKOFF, Primary Examiner

D. EDWARDS, Assistant Examiner

U.S. Cl. X.R.

203—22, 39; 202—202, 273; 210—23, 253